United States Patent [19]
Kaneko et al.

[11] 3,882,955
[45] May 13, 1975

[54] SAFETY BELT DEVICE FOR VEHICLES

[75] Inventors: Yuichiro Kaneko, Nagoya; Takfhiko Nishikawa, Inazawa, both of Aichi, Japan

[73] Assignee: Kabushiki-Kaisha Tokai-Rika-Denki-Seisakusho, Aichi-pref., Japan

[22] Filed: June 19, 1973

[21] Appl. No.: 371,562

[30] Foreign Application Priority Data
June 22, 1972 Japan............................... 47-062612
June 22, 1972 Japan............................... 47-062613
June 22, 1972 Japan............................... 47-062614

[52] U.S. Cl................................................ 180/82 C
[51] Int. Cl. ............................................ B60r 21/10
[58] Field of Search ............. 180/82 C; 280/150 SB; 297/384, 388, 389

[56] References Cited
UNITED STATES PATENTS

| 3,506,083 | 4/1970 | Botnick et al..................... | 180/82 C |
| 3,653,714 | 4/1972 | Gentile........................... | 280/150 SB |
| 3,757,064 | 9/1973 | Ogawa............................. | 280/150 SB |
| 3,806,155 | 4/1974 | Hafele et al..................... | 280/150 SB |

Primary Examiner—Duane A. Reger
Assistant Examiner—Gregory W. O'Connor

[57] ABSTRACT

An automatically binding safety belt device for use in vehicles, which is so designed that a safety belt binds the body of a rider automatically when the rider closes a door upon setting on his seat.

4 Claims, 10 Drawing Figures

SAFETY BELT DEVICE FOR VEHICLES

This invention relates to an automatically binding safety belt device for use in vehicles and also to a device for taking-up the belt of said automatically binding safety belt device.

It is an object of the present invention to provide an automatically binding safety belt device for use in vehicles, which is so designed that a safety belt binds the body of a rider automatically when the rider closes a door upon sitting on his seat.

It is another object of the invention to provide a device for winding the belt of the automatically binding safety belt device of the character described above.

The present invention will be described hereunder with reference to the accompanying drawings.

Figure 1:
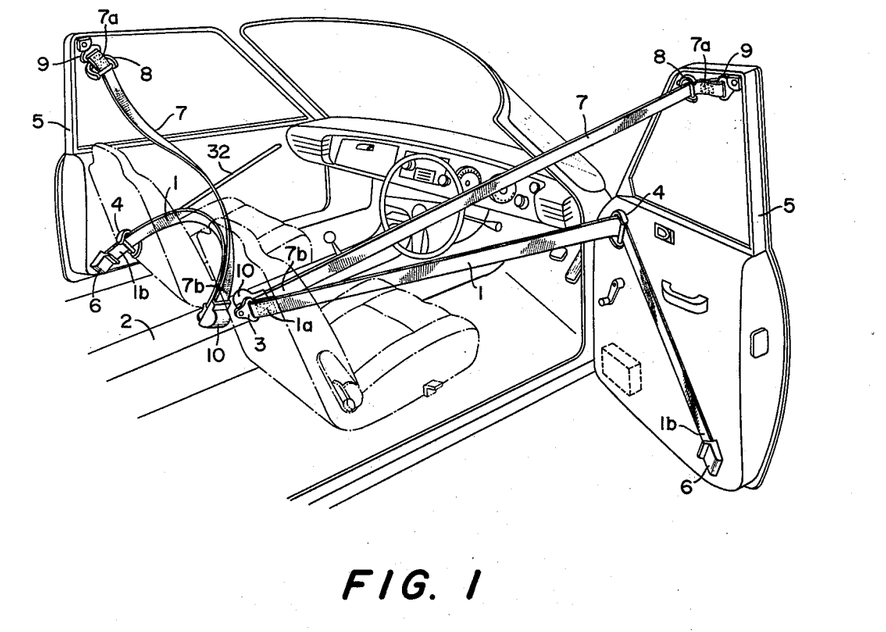
FIG. 1 is an illustrative perspective view of an embodiment of the automatically binding safety belt device of the present invention as mounted on an automotive vehicle, the door of the automotive vehicle close to the driver's seat being left open after the driver has gotten off the vehicle and the door close to the assistant driver's seat being closed after the assistant driver has gotton on the vehicle.

Referring to FIG. 1, there is shown a state of an automotive vehicle, in which the door adjacent the driver's seat is left open and the door adjacent the assistant driver's seat is closed after the assistant driver has gotton on the vehicle, and further the safety belt for the assistant driver's seat of an automatically binding safety belt device according to the invention, provided on said automotive vehicle, is in its binding position. The automatically binding safety belt device according to the invention, as shown in FIG. 1, includes waist belts 1 each having one end 1a fixed to an anchor plate 3 provided at the central portion 2 of the vehicle body and the other end 1b extended through a waist belt guide ring 4 and connected to winding means 6 provided at the lower portion of each door 5. It also includes shoulder belts 7 each having one end 7a extended through a shoulder belt guide ring 8 and fixed to an anchor plate 9 provided at the upper portion of each door 5, and the other end 7b connected to winding means 10 provided at the central portion 2 of the vehicle body. The winding means 6, 10 are of the so-called emergency lock type and hold the waist belts 1 and shoulder belts 7 when loads are imposed abruptly on said respective belts.

Figure 2:
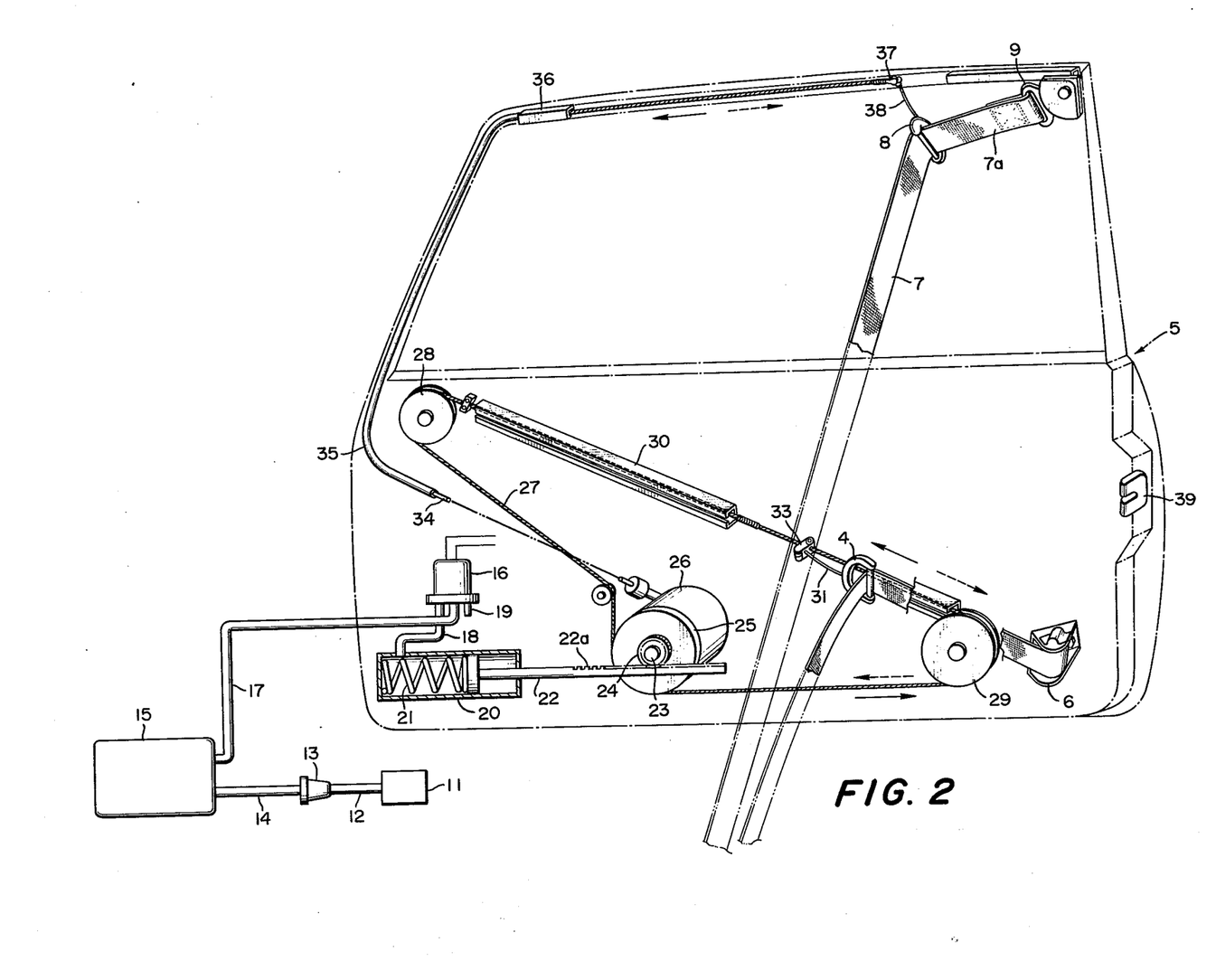
FIG. 2 is a front view of guide ring operating means mounted in the door.

In FIG. 2, there is shown a device for operating the waist belt guide ring 4 and shoulder belt guide ring 8, which is provided in each door 5. These guide ring operating devices are actuated by the vacuum pressure in the intake manifold 11 of the engine of the automotive vehicle. Namely, a check valve 13 is provided in a pipe 12 connected to the intake manifold 11 and a vacuum tank 15 for accumulating the vacuum pressure therein is connected to said check valve 13 by a pipe 14. The vacuum tank 15 is also connected by a pipe 17 to a solenoid valve 16 which is opened and closed by a door switch to be described later. The solenoid valve 16 has connected thereto a pipe 18 connected to a cylinder 20 and a pipe 19 communicating with the atmosphere. Therefore, when the solenoid valve 16 is opened, the vacuum tank 15 and the cylinder 20 are communicated with each other and the vacuum pressure appears also in said cylinder 20. On the other hand, when the solenoid valve 16 is closed, the communication between the vacuum tank 16 and the cylinder 20 is severed and said cylinder 20 is communicated with the pipe 19, so that the atmospheric pressure appears in said cylinder 20. Thus, a piston 22 disposed in the cylinder 20 makes a reciprocal motion therein. The piston 22 is constantly urged to the right as viewed in FIG. 2 by a spring 21. One end of the piston 22 forms a rack gear 22a which is meshing with a pinion gear 24 fixedly mounted on a drive shaft 23. Also fixedly mounted on the drive shaft 23 are a pulley drum 25 and a coupling 26. It will be understood, therefore, that the pinion gear 24, the pulley drum 25 and the coupling 26 coaxially mounted on the drive shaft 23 rotate incident to the reciprocal motion of the piston 22. Reference numeral 27 designates a wire engaged around the pulley drum 25 and other two pulley drums 28, 29, and 30 designates a guide rail provided along the wire 27 slantingly downwardly from the inner upper portion of the door between the pulley drums 28 and 29. A guide ring 4 for loosely passing the waist belt 1 therein is connected to a suitable point of the wire 27, extending in the guide rail 30, by a string 31. A slit 32 is formed in the door 5 along the guide rail 30 (see FIG. 1). The string 32 passes through a ring 33 which is fixed on the wire 27 at a point adjacent the waist belt guide ring 4 to prevent oscillation of said guide ring. A wire 34 which is made of a synthetic resin has one end connected to the coupling 26 to be wound thereon, and the other end of said wire 34 passes in an outer tube 35 embedded in the door frame and in a guide rail 36 provided at the upper portion of the door 5 and has a shoulder belt guide ring 8 connected thereto by a roller 37 and string 38. Reference numeral 39 designates the aforesaid door switch for controlling the operation of the solenoid valve 16, which is incorporated in a door lock. In FIG. 2, the solid line arrows indicate belt take up directions and the dotted line arrows indicate belt take down directions.

Figure 3:
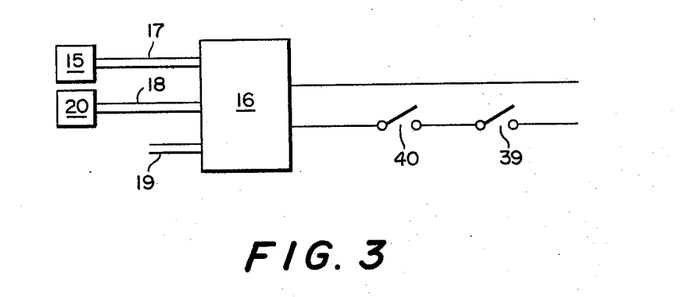
FIG. 3 is a diagram showing briefly the wiring circuit of the safety belt device.

FIG. 3 shows briefly the electrical connection of the door switch 39, the solenoid valve 16 and a seat switch 40 provided beneath each seat of the vehicle and actuated by the weitht of a passenger when the passenger sits on said seat. As seen, the door switch 39 and the seat switch 40 are connected in series. Therefore, the solenoid valve 16 is actuated (opened) only when both the switches 39, 40 are in their ON positions (when the rider got on the vehicle and closed the door). Upon actuation of the solenoid valve 16, the pipes 17 and 18 communicate with each other and the piston 22 in the cylinder 20 moves to the left against the spring 21 under the effect of the vacuum pressure in the vacuum tank 15. When the seat switch 40 is in its OFF position (when the rider got off the vehicle) and when the seat switch 40 is in its ON position and the door switch in its OFF position (when the rider is on the seat and the door is left open), the solenoid valve 16 is not actuated and, therefore, the pipes 17 and 18 are out of communication and the pipes 18 and 19 are in communication with each other, so that the atmospheric pressure appears in the cylinder 20 and the piston 22 is moved to the right by the spring 21.

The automatically binding safety belt device of the construction described above operates in the following manner:

First of all, the operation of the safety belt device when a rider gets on the vehicle will be explained. The guide rings 4, 8 for the waist belt 1 and should belt 7 are in their positions closer to the door hinge respectively when the door 5 is in its open position, and remain in their positions even after the rider has gotton on the vehicle and sat on the seat because the door switch 39 is still in its OFF position, though the seat switch 40 beneath the seat is turned ON. When the door 5 is closed in this condition, the door switch 39 is turned on to actuate the solenoid valve 16, so that communication is established between the pipes 17 and 18, and the vacuum pressure accumulated in the vacuum tank 15 from the intake manifold 11 through the check valve 13 acts in the cylinder 20 through the pipes 17, 18 causing the piston 22 to move to the left against the spring 21. As the piston 22 moves to the left, the rack gear 22a of said piston rotates the pinion gear 24 in a clockwise direction (in the direction of the dotted line arrow), so that the drive shaft 23 fixed to said gear 24 rotates in a clockwise direction and the pulley drum 25 and coupling 26, fixedly mounted on said shaft 23, also rotate in the same direction. The rotation of the pulley drum 25 results in a movement of the wire 27 in the direction of the dotted line arrow and the guide ring 4 connected to said wire 27 moves along the guide rail 30 drawing the waist belt 1 towards the lower rear corner of the door 5. Concurrently, the coupling 26 mounted on the drive shaft 23 forces out the resin wire 34 wound thereon, so that the guide ring 8 moves drawing the shoulder belt 7 towards the upper rear corner of the door. Excess lengths of the belts 1, 7 are taken up by the winding means 6, 10 respectively. Thus, the body of the rider is bound by the waist belt 1 and shoulder belt 7.

Next, the operation of the safety belt device when the rider gets off the vehicle will be explained. When the rider pulls the handle on the inside of the door 5, the door switch 39 is turned OFF and the solenoid valve 16 is deenergized. Communication is established between the pipes 18 and 19, and the atmospheric pressure is introduced into the cylinder 20 through the pipes 19, 18. The piston 22 is moved to the right by the spring 21, and the pinion gear 24, the pulley drum 25 and the coupling 26 rotates in a counterclockwise direction (in the direction of the solid line arrow). The rotation of the pulley drum 25 results in a movement of the wire 27 in the direction of the solid line arrow and thus the guide ring 4 connected to said wire 27 moves along the guide rail 30 drawing the waist belt 1 towards the upper front portion of the door 5. Concurrently, the coupling 26 winds up the resin wire 34 incident to the counterclockwise rotation of the drive shaft 23, to shift the guide ring 8. Thus, the guide rings 4, 8 are shifted to their positions closer to door hinge and the passenger is released from restrainment by the belts 1, 7. When the rider closes the door 5 upon getting off the vehicle, the door switch 39 is actuated but the seat switch 40 is in its OFF position, so that the belts 1, 7 remain in their unbinding positions.

Figure 4:
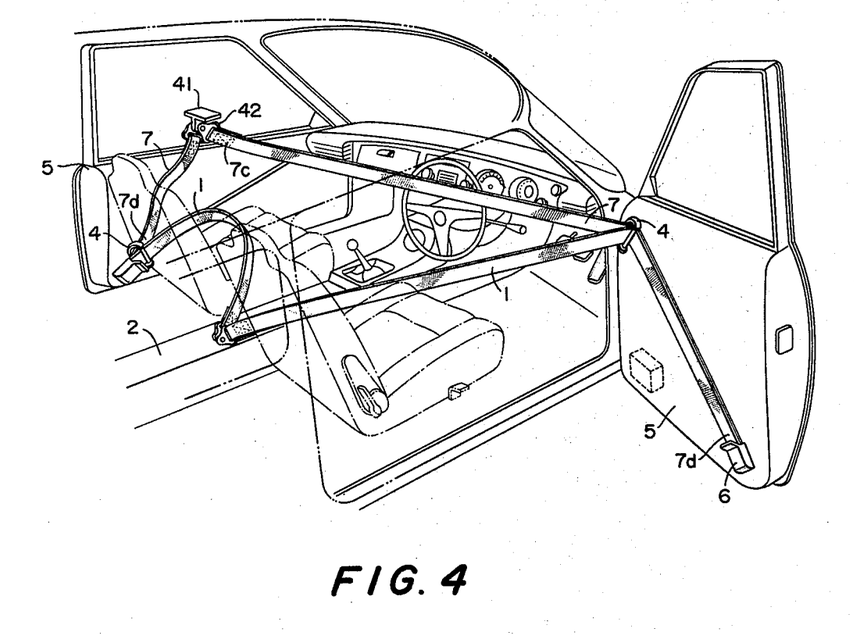
FIG. 4 is a perspective view showing another belt arrangement.

FIG. 4 shows another arrangement of the belts. The belt 1 is connected to the vehicle body in the same way as in FIG. 1, but the shoulder belt 7 has one end 7c anchored to an anchor plate 42 fixed to an anchor member 41 provided at the central portion of the roof of the vehicle body and the other end 7d connected to the waist belt winding means 6 after passing it through the waist belt guide ring 4. Namely, both the waist belt 1 and the shoulder belt 7 are passed in the waist belt guide ring 4 and wound up by the winding means 6. In this case, therefore, the coupling 26, the resin wire 34, the outer tube 35, the guide rail 36, the roller 37, the string 38, the shoulder belt guide ring 8 and the anchor plate 9, shown in FIG. 2, can be eliminated, and the waist belt 1 and shoulder belt 7 are taken up and taken down by the waist belt guide ring 4 which is operated in the same manner as in the preceding embodiment.

With the safety belt device of the invention, as may be understood from the foregoing description, the waist belt is automatically applied to the body of the rider to bind the same incident to the door opening and closing operations, so that inadvertent failure in and cumbersomeness of applying the safety belts can be eliminated. Further, since the safety belt device of the invention is so designed that the belts move incident to the door opening and closing operations only when the seat switch is in its On position, the belts do not make unnecessary movements and do not interfere with the rider getting on or off the vehicle as the guide rings for these belts are located in the positions closer to the door hinge in such cases.

Although vacuum pressure is used in the embodiment described above for operating the safety belt device, it will be ovvious that compressed air or oil pressure may also be used to achieve the same effect, by changing the position of the spring 21, reversing the position of the solenoid valve 16 and changing the position of engagement between the rack gear 22a and the pinion gear 24.

Figure 5:
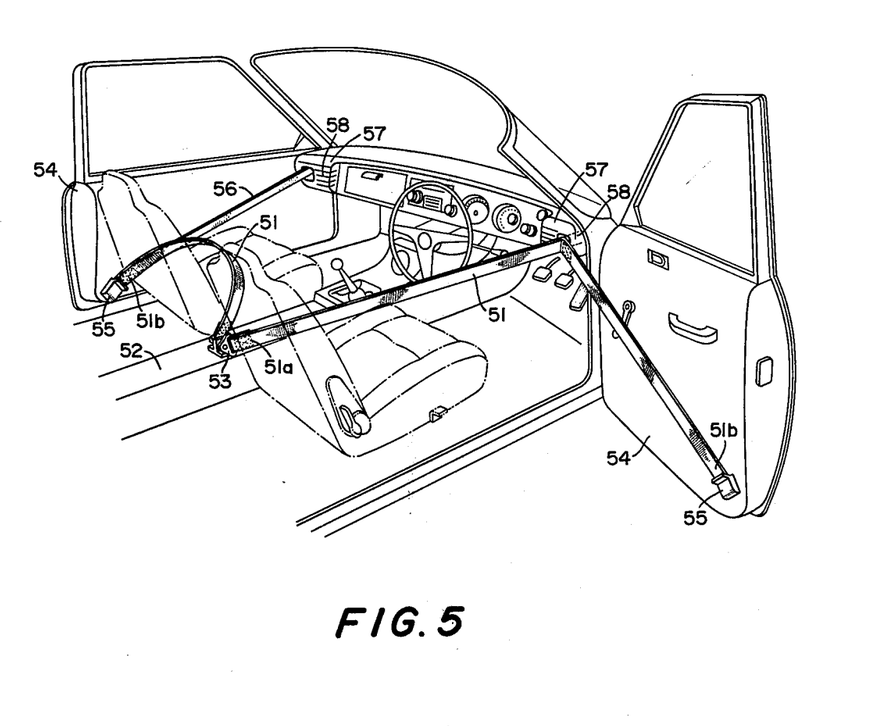
FIG. 5 is an illustrative perspective view of another embodiment of the automatically binding safety belt device of the invention, the door of the vehicle close to the driver's seat is left open and the door close to the assistant driver's seat being closed after the assistant driver has gotton on the vehicle.
Figure 6:
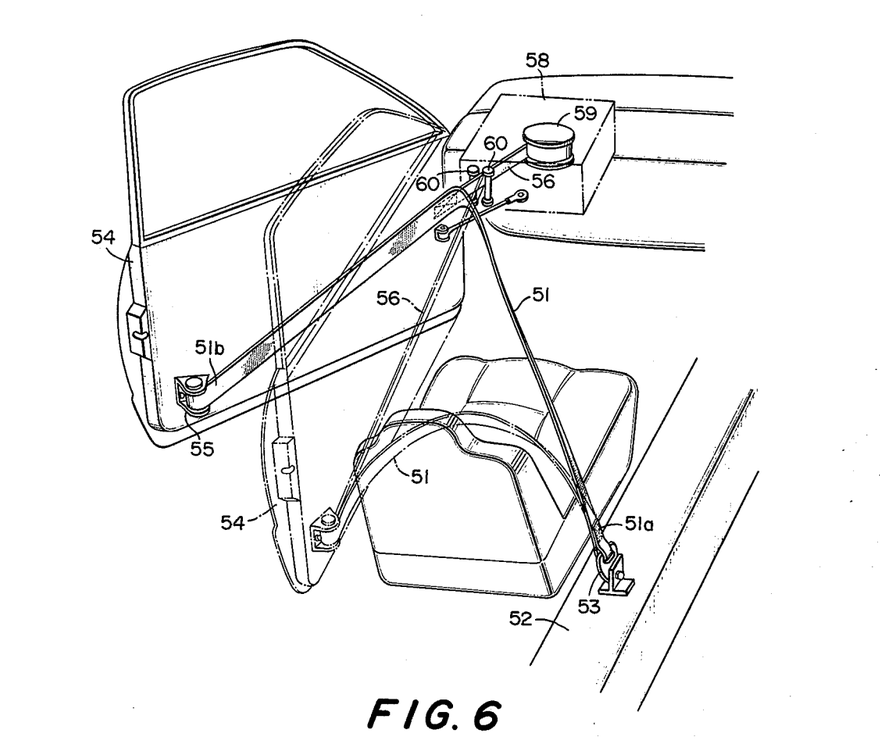
FIG. 6 is a perspective view for illustrating the operation of the belt.
Figure 7:
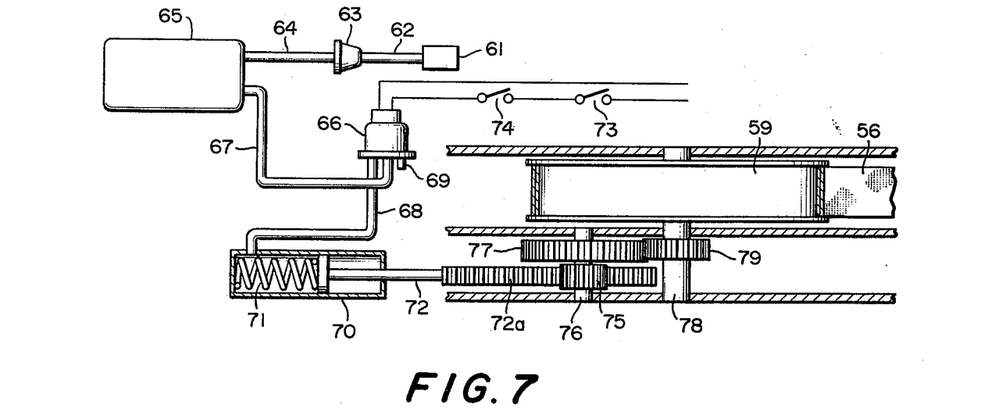
FIG. 7 is a sectional view of an embodiment of the belt winding device according to the present invention.

Another embodiment of the invention will be described with reference to FIGS. 5 – 7. In this embodiment, a belt 51 for each seat to bind the body of the rider has one end 51a secured to an anchor plate 3 fixed to the central portion 52 of the vehicle body and the other end 51b connected to winding means 55 provided at the lower rear portion of the door. The winding means 55 is of the so-called emergency lock type which holds the belt 1 when loads act abruptly thereon. A tape 56 is provided extending along the door 54, which has one end bonded to the belt 51 and the other end connected to a rotatable drum 59 of belt a take-up device 58 which is provided in the dash-board 57 and will be described later. Gude rollers 60 for guiding the tape 56 are respectively rotatably mounted on pins between base plates of the belt winding means 58.

One form of the safety belt take-up device 58 will be described hereunder with reference to FIG. 7. The belt winding means 58 utilizes the vacuum pressure in the intake manifold 61 of the engine as the driving source for winding the belt 51. Namely, a check valve 63 is connected to the intake manifold 61 by a pipe 62 and said check valve 63 is also connected by a pipe 64 to a vacuum tank 65 for accumulating the vacuum pressure therein. The vacuum tank 65 in turn is connected by a pipe 67 to a solenoid valve 66 for opening and closing said valve, and the solenoid valve 66 is connected by a pipe 68 in communication with a cylinder 70 to a pipe 69 open in the atmosphere. A piston 72 is disposed in the cylinder 70 for reciprocal motion therein. This piston 72 is normally biased to the right as viewed in FIG. 7 by a spring 71. The solenoid valve 66 has electrically connected thereto in series a door switch 73 operated by the door opening and closing operations and a seat switch 74 provided beneath each seat and operated under the weight of the passenger when the rider sits down on said seat. The arrangement is such that the solenoid valve 66 is actuated (opened) only when the switches 73, 74 are both in their ON positions (when the rider got on the vehicle and closed the door). Upon actuation of the solenoid valve 66, the pipes 67 and 68 communiate with each other and the piston 72 in the cylinder 70 moves to the left against the spring 71 under the effect of the vacuum pressure introduced into said cylinder from the vacuum tank 65 through the pipes 67, 68. The solenoid valve 66 is not actuated when the seat switch 74 is in the OFF position (when the rider got off the vehicle) and when the seat switch 74 in the ON position and the door switch is in its OFF position (when the rider is sitting on the seat, with the door opened). In this case, the pipes 67 and 68 are out of communication and the pipes 68 and 69 are in communication with each other, so that the atmospheric pressure appears in the cylinder 70 and the piston 72 is held in its rightward position by the spring 72. The piston 72 has a rack gear 72 a formed at one end thereof, which is meshing with a pinion gear 75. A gear 77 fixedly mounted on a drive shaft 76 coaxially with the gear 75 is meshing with a gear 79 fixedly mounted on a drum shaft 78. Thus, it will be understood that the reciprocal motion of the piston 72 is amplified by the rack gear 72a, the pinion gear 75 and the gears 77, 79 and transmitted to the drum shaft 78. The drum shaft 78 has the aforesaid drum 59 fixedly mounted thereon, and one end of the aforesaid tape 56, which is bonded to the belt 51, is secured to said drum 59.

Now, the operation of the safety belt take-up device of the construction described above will be explained.

First of all, the operation of the device when a rider gets on the vehicle will be described. When the rider opened the door to get on the vehicle and holds it in the open position, the door switch 73 and the seat switch 74 are in their OFF positions and, therefore the atmospheric pressure appears in the cylinder 70 which is introduced through the pipes 69, 68 and the piston 72 is held in its rightward position by the spring 71. In this state, the tape 56 is wound up on the drum 59 and the belt 51 is also wound up, so that the belt does not interfere with the person getting on the vehicle. When the rider has gotton on the vehicle and sat down on the seat, the seat switch 74 is turned ON but the door switch 73 remains in its OFF position. The door switch 73 is turned ON when the rider closes the door, whereupon the solenoid valve 66 is actuated to establish communication between the pipes 67 and 68. The vacuum pressure accumulated in the vacuum tank 65 through the check valve 63 from the intake manifold 61 acts in the cylinder 70 through the pipes 67, 68 causing the piston 72 to move to the left against the spring 71. The leftward movement of the piston 72 results in a rotation of the drum 59 through the rack gear 72a, the pinion gear 75 and the gears 77, 79, to unwind the tape 56. The unwound tape 56 is taken up on the winding means 55, provided at the lower portion of the door, together with the belt 51. Thus, the body of the passenger is bound by the belt 51.

The safety belt take-up device operates as follows when the rider gets off the vehicle. The rider first open the door 54 while sitting on the seat. In this case, the seat switcih 74 remains in its ON position but the door switch 73 is turned OFF. Therefore, the solenoid valve 66 is deenergized to establish communication between the pipes 68 and 69. The atmospheric pressure is supplied into the cylinder 70 through the pipes 69, 68 and the piston 72 is moved to the right by the spring 71. The rack gear 72 rotates the drum 59 through the pinion gear 75 and the gears 77, 79 in the direction opposite to the case when the rider gets on the vehicle, to cause said drum to wind up the tape 56. Therefore, the belt 51 is also wound up to release the rider from restrainment, providing for getting off of the rider from the vehicle.

According to this embodiment, as may be understood from the foregoing description, the belt is automatically applied to the body of the rider to being the same incident to the door opening and closing operation, so that inadvertent failure in and cumbersomeness of applying the safety belt can be eliminated. Further, since the safety belt device of this embodiment is so designed that the belt moves incident to the door opening and closing operation only when the seat switch is in its ON position, the belt does not make unnecessary movements and does not interfere with the rider as the belt is wound up and cleared from the way of the rider always when the rider gets on or off the vehicle.

Although vacuum pressure is used in the embodiment described above for operating the safety belt device, it will be obvious that compressed air or oil pressure may also be used to achieve the same effect, by changing the position of the spring 71, reversing the position of the solenoid valve 66 and changing the position of engagement between the rack gear 72a and the pinion gear 75.

Figure 8:
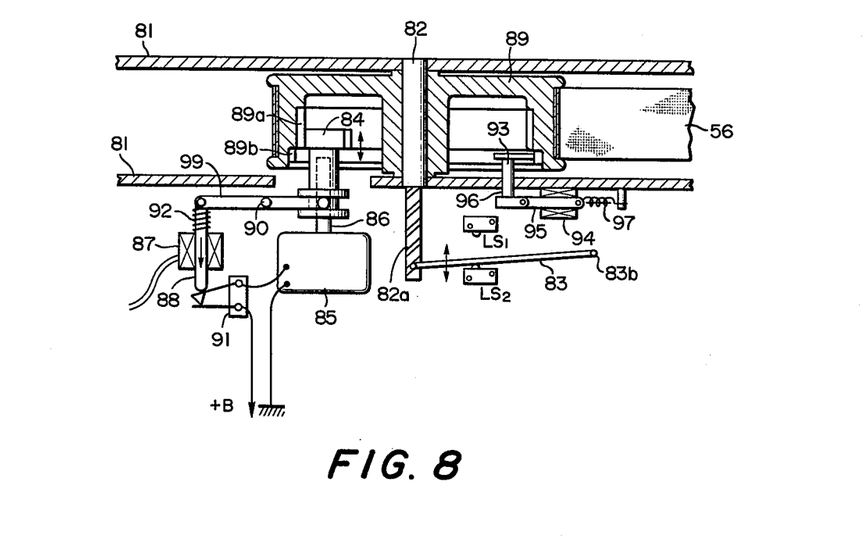
FIG. 8 is a sectional view of another embodiment of the belt winding device of the invention.
Figure 9:
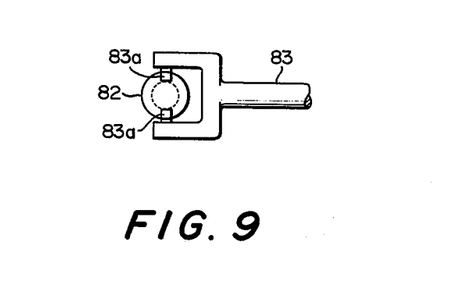
FIG. 9 is a plan view showing the engagement between the rotary shaft and the actuator.

Now, anotherform of the safety belt take-up device will be described with reference to FIG. 8. A drum 89 is fixedly mounted on a winding shaft 72 rotatably supported by base plates 81 and has an auxiliary belt 56 secured to the outer peripheral surface thereof. The inner peripheral surface of the drum 89 are formed with an inner gear 89a and a ratchet gear 89b. One end of the winding shaft 82 is formed with a spiral groove 82a in which projections 83a formed at a bifurcated end of an actuator 83 are engaged as best shown in FIG. 9. Thus, it will be understood that the actuator 83 makes a pivotal movement about a fulcrum point 83b incident to the rotation of the drum 89. Detector switches $LS_1$ and $LS_2$ are provided for detecting whether the belt is wound on the drim 89 or not. These switches are of a normally closed type and are respectively in an ON position when out of contact with the actuator 83 and in an OFF position when in contact with the actuator 83. The inner gear 89a of the drum 89 is meshing with a clutch 84 which is slidably mounted on and driven by a drive shaft 86 of a motor 85. The clutch 84 is slidingly moved up or down on the drive shaft 86 for engagement or disengagement with the inner gear 89a, by a clutch arm 99 which is pivotally connected to one end of and caused to make a pivotal movement about a fulcrum point 90 by a plunger core 88 operated by a solenoid 87. The other end of the plunger core 88 is positioned opposite to a motor switch 91 for the motor 85 to operate the same. The clutch arm 99 is urged by a spring 92 to make a pivotal movement in a clockwise direction. A ratchet pawl 93 is operated into or out of engagement with the ratchet gear 89b of the drum 89, by a solenoid 94 through a plunger core 95 and a pin 96 fixedly mounted on said plunger core. The ratchet pawl 93 when in engagement with the ratchet gear 89b allows the drum 89 to rotate in one direction but prevents it from rotating in the other direction. The plunger core 95 is constantly urged to the right as viewed in FIG. 8 by a spring 97.

Figure 10:
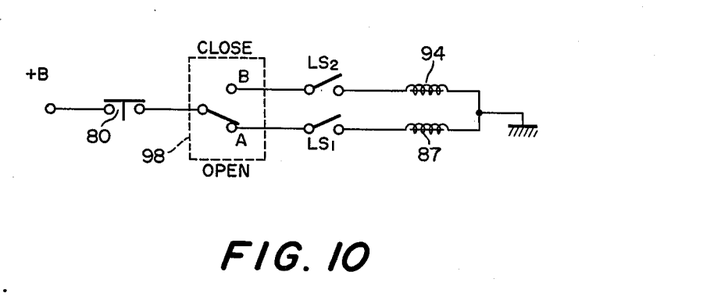
FIG. 10 is a diagram showing briefly the wiring circuit of the belt winding device.

FIG. 10 is a diagram showing the electrical connection of the solenoids 87, 94, the detector switches $LS_1$, $LS_2$, the door switch 98 and the seat switch 80. As seen, the solenoid 87 and the detector switch $LS_1$ are electrically connected with a contact A of the door switch 98 which is closed with the door is opened, and the solenoid 94 and the detector switch $LS_2$ are electrically connected to a contact B of the door switch 98 which is closed when the door is closed.

The safety belt take-up device of the construction described above operates in the following manner:

First of all, the operation of the take-up device when the rider gets off the vehicle will be explained. Before the rider goes in the get-off motion, the seat switch 80 is in its ON position and the door switch 98 is in its closed position, with the contactor in contact with the contact B. Further, the detector switch $LS_1$ is in its ON position and the detector switch $LS_2$ in its OFF position. Therefore, the solenoid 94 is in the deenergized state and the ratchet pawl 93 is in engagement with the ratchet gear 89b of the drum 89. Further, since the contact B of the door switch 80 is held closed, the solenoid 87 is in the deenergized state, holding the plunger core 92 in its elevated position, the clutch 84 is out of engagement with the inner gear 89a of the drum 89 and the motor switch 91 is in its OFF position, holding the motor 85 unrotatably. When the door is opened in such state, the door switch 98 is opened with the contactor shifted into contact with the contact A. Since the detector switch $LS_1$ is in its ON position as stated above, the solenoid 87 is actuated when the door switch 98 is opened, and the plunger core 88 is moved down. The clutch arm 99 is caused to make a pivotal movement in a counterclockwise direction about the fulcrum point 90 and thus, the clutch 84 is brought into engagement with the inner gear 89a of the drum 89. Concurrently, the motor switch 91 is turned ON by the downward movement of the plunger core 88 and the motor 85 starts rotating. The drum 89 is driven by the clutch gear 84 to wind up the auxiliary belt 56. As the auxiliary belt 56 is wound up on the drum 89 which is driven from the motor 85, the actuator 83 is brought into contact with the detector switch $LS_1$ to open the same and the solenoid 87 is deenergized. The plunger core 88 of the solenoid 87 is moved up by the spring 92 to cause the clutch arm 99 to make a pivotal movement in a clockwise direction and thus the clutch 84 is disengaged from the inner gear 89a of the drum 89. At the same time, the motor switch 91 is opened to stop the motor 85.

When the rider gets on the vehicle, the safety belt take-up means operates as follows: Before the rider gets on the vehicle, the seat switch 80 is in its OFF position and the door is in the closed position. Therefore, the belt 51 is in the wound position. When the rider opens the door to get on the vehicle, the door switch 98 is opened but the seat switch 80 remains in its OFF position, so that the belt is still in the state of being wound up and makes way for the rider to get on the vehicle. When the rider has gotten on the vehicle, the seat switch 80 is opened but the door switch 98 is still in its open position, the detector switch $LS_1$ in its OFF position and the detector switch $LS_2$ in its ON position. Therefore, the belt is held in its position. When the rider closes the door in this condition, the door switch 98 is closed and the solenoid 94 is energized, so that the plunger core 95 moves to the left against the spring 97 and the ratchet pawl 93 is disengaged from the ratchet gear 89b of the drum 89, rendering said drum freely rotatable. Thus, the belt 51 and auxiliary belt 56 are drawn out from the winding means and taken up on the winding means 55, and the body of the rider is bound by the belt 51.

We claim:

1. A safety belt device for vehicles, comprising a door switch operating when a door is opened and closed, a solenoid valve actuated by the operation of said door switch, vacuum cylinder means connected through said solenoid valve to a vacuum tank which is connected to an intake manifold and including a pistion disposed therein for a reciprocal motion, guide ring means operated by said vacuum cylinder means, and belt means loosely passed through and operated by said guide ring means, said piston being constantly urged to one end of said vacuum cylinder means by a coiled spring and having a free end portion formed with a rack gear which is engaged with a pinion gear fixedly mounted on a drive shaft.

2. A safety belt device for vehicles according to claim 1, in which a waist belt is loosely passed through a guide ring which is movable along a guide rail provided in the inside of the door from the upper front portion to the lower rear portion of the door, and a shoulder belt is loosely passed through another guide ring which is movable along another guide rail provided in the door frame, and in which when said solenoid valve is opened, said vacuum cylinder means is communicated with said vacuum tank to move said piston toward the other end thereof against action of the spring for moving said belt means to an operative position and when said solenoid valve is closed, said vacuum cylinder means is communicated with the atmosphere to return said piston to its biased position under action of the spring for moving said belt means to an inoperative position.

3. A safety belt device for vehicles according to claim 1, in which a seat switch is provided beneath a seat and operates when a rider gets on and off the seat, said solenoid valve being operated only when said seat switch is in an ON position.

4. A safety belt device for vehicles according to claim 2, in which a pulley drum and a coupling are fixedly mounted on said drive shaft and rotated by said vacuum cylinder means, said pulley drum having a wire for said waist belt connected thereto and moving said wire in a direction such that said waist belt reaches an operative position when operated by the vacuum cylinder means, and said coupling having another wire for said shoulder belt connected thereto and forcing out said other wire, in a direction such that said shoulder belt reaches an operative position when operated by the vacuum cylinder means.

* * * * *